United States Patent [19]

Brown

[11] 4,078,125
[45] Mar. 7, 1978

[54] ENERGY DENSITY IRON-SILVER BATTERY

[75] Inventor: Jack T. Brown, Churchill Borough, Pa.

[73] Assignee: Westinghouse Electric Corporation, Pittsburgh, Pa.

[21] Appl. No.: 690,444

[22] Filed: May 27, 1976

[51] Int. Cl.² .............................................. H01M 2/16
[52] U.S. Cl. .................................. 429/145; 429/219; 429/221
[58] Field of Search ............... 429/219, 221, 145, 144, 429/254, 249

[56] References Cited

U.S. PATENT DOCUMENTS

| | | | |
|---|---|---|---|
| 2,677,006 | 4/1954 | Ameln | 429/221 X |
| 3,790,409 | 2/1974 | Fletcher et al. | 429/219 X |
| 3,853,624 | 12/1974 | Brown et al. | 429/221 |
| 3,907,604 | 9/1975 | Prentice | 429/254 |
| 3,935,026 | 1/1976 | Howard | 429/219 X |
| 3,947,537 | 3/1976 | Buntin et al. | 429/254 X |

Primary Examiner—C. F. LeFevour
Attorney, Agent, or Firm—D. P. Cillo

[57] ABSTRACT

An iron-silver battery is made, consisting of at least one positive electrode plate and at least one negative electrode plate housed in a case containing an alkaline electrolyte; where the positive plate comprises a silver supporting plaque containing silver active battery material, the negative plate comprises an expansible, diffusion bonded, metal fiber supporting plaque containing iron oxide active battery material with a sulfur additive, and the plates are separated from each other by a material that is not chemically attacked by the electrolyte or ions contained in the electrolyte. The silver electrode is disposed between and contacts 60% to 90% porous separators and a microporous separator contacts the porous separator forming a multi-ply laminate.

15 Claims, 7 Drawing Figures

ENERGY DENSITY IRON-SILVER BATTERY

BACKGROUND OF THE INVENTION

The commercially available rechargeable electrochemical battery system with the greatest stored energy per unit weight and volume is based on the well-known silver-zinc couple. Since the silver plate is quite expensive, use of this battery system is restricted to applications where the energy density of the battery is critical to the total system mission. An example of such an application is the propulsion system power source for underseas vehicles.

Since the commercial introduction of this battery, about twenty years ago, several hundred million dollars has been spent on research and development of the engineered product, which still has great reliability problems. Silver-zinc cells often spontaneously exhibit internal electrical shorts due to breakdown of the separator material caused by silver oxidation and zinc dendritic growth. Both plates are somewhat soluble in the electrolyte which indicates an undesirable thermodynamic instability.

The zinc plate on recharge has a tendency to grow sharp dendritic, needlelike, crystals which penetrate the separators. The smallest deformation or fracture in the separator is a path through which a zinc dendrite can form. A path also exists if the electrolyte level is above the top of the separators. This means that a silver-zinc battery must remain in essentially a vertical position. Even in the best case, the zinc electrode changes shape by slumping on cycling, causing drastic loss of cell capacity in a few tens of cycles.

In another very serious associated problem, a conducting silver film tends to deposit on the separators. On charge, silver peroxide is formed on the silver plate. This is slightly soluble in the electrolyte and will form perhydroxyl ions in solution which chemically attacks the cellulose of the standard cellophane separator systems. Silver can then deposit on the zinc plate causing deleterious effects on the battery system.

This poor life and reliability of the silver-zinc system has impeded its use in many applications and restricted the type of missions the battery system could engage in. Fletcher, in U.S. Pat. No. 3,790,409, tried to solve these problems by using a separator system consisting of several polyethylene-methacrylic acid semipermeable membranes sandwiched between a single polypropylene electrolyte absorber sheet and a multiple layer of regenerated cellulose as the prime electrolyte absorber material. Arrange, in U.S. Pat. No. 3,671,319, preferred inorganic separators, such as zirconia or magnesium-iron silicates.

Ameln, in U.S. Pat. No. 2,677,006, taught a battery cell comprising porous anodes made of sintered nickel powder particles supported by a nickel or nickel plated iron net. The positive plate was provided with a silver oxide active battery material. The negatives plates were made of pockets of perforated iron sheet plated with nickel, or pockets of perforated iron or nickel sheet. The active battery material for the negative plate consisted of iron, iron-cadmium, or iron-mercury oxide, which was contained within the pockets of the rather bulky, heavy structure.

Brown et al, in U.S. Pat. No. 3,853,624, taught a high energy density battery based on an iron-nickel couple, utilizing a porous, metal fiber plate construction. This type of battery provides excellent energy density values of about 24 watt-hours/pound and 1.8 watt-hours/cubic inch of cell.

None of these battery systems, however, provides the necessary long life, reliability, light weight, compactness, and energy density values, of about 35 watt-hours/pounds and 2.5 watt-hours/cubic inch of cell, up to about 200 deep discharge-charge cycles, required for use, such as an alternate power source in submarines, where cost is of secondary importance.

SUMMARY OF THE INVENTION

This invention relates to the development of a new and vastly improved light weight, compact, reliable high energy density battery system. The system comprises an iron-silver couple, utilizing a substantially pure silver support and active material in the positive plate, a flexible, expansible, fiber metal support structure in the negative plate. The systems requires plastic separators between the plates that are effective to retard continuous silver coating of the separators and which are resistant to chemical atack by perhydroxyl or other ions contained in the electrolyte solution. These new and improved battery cells, having uniquely tailored separator systems, provide energy density values of 40 watt-hours/pound and 2.5 watt-hours/cubic inch of cell from about 30 to 300 cycles.

BRIEF DESCRIPTION OF THE DRAWINGS

For a better understanding of the invention reference may be made to the exemplary embodiments shown in the accompanying drawings, in which.

DESCRIPTION OF THE PREFERRED EMBODIMENTS

Figure 1:
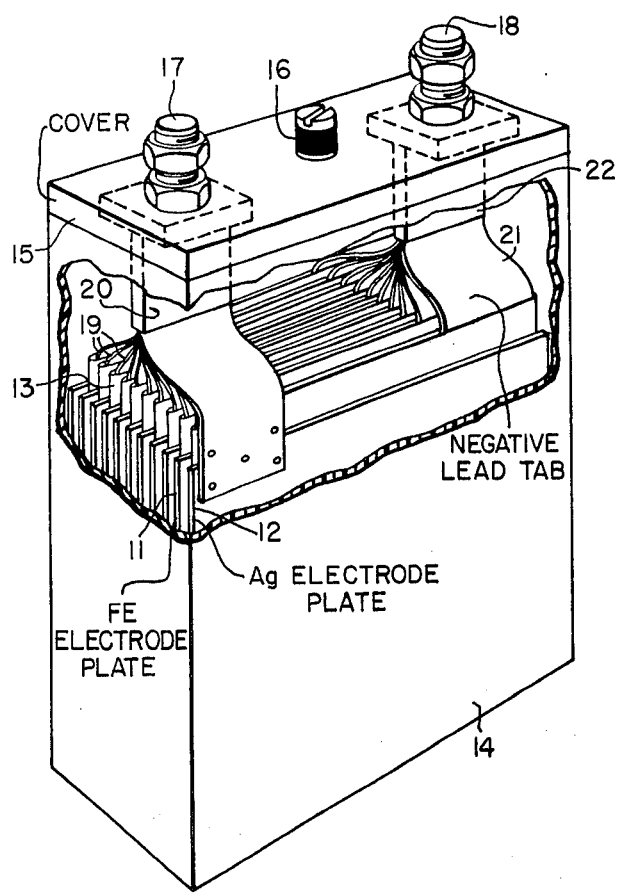
FIG. 1 shows a perspective view of the ironsilver, super high energy density battery cell of this invention.

FIG. 1 shows one embodiment of the Fe-Ag battery cell of this invention, with the plurality of loaded negative Fe electrode plates 11, plurality of positive Ag electrode plates 12, plate seaparators 13 between the positive and negative plates, all housed in case 4, having cover 15, vent 16, positive terminal 17, and negative terminal 18. Positive lead tabs 19 are shown attached to intercell connection lug 20 and negative lead tabs 21, disposed 180° away from the positive tabs, are shown attached to intercell connection lug 22. These lead tabs provide means for making electrical connections to the respective plates.

A suitable alkaline electrolyte, generally 25%–40% aqueous KOH, would contact the electrode plates and separators within the case. The plate separators, which are preferably of a multiply construction of porous and microporous polypropylene, are generally shown at 13, not surrounding the plates for clarity of illustration. The plates preferably slide into the separators, which are of an envelope type construction having the porous ply contacting the plates.

Figure 2:
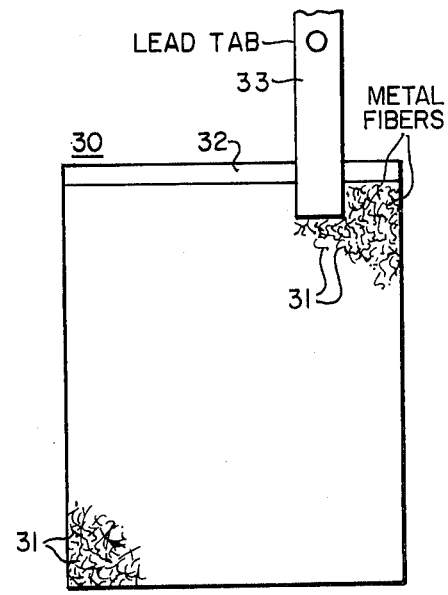
FIG. 2 shows one configuration of the unloaded, flexible, expansible, fiber metal electrode plaque that can be used for the iron plate in the battery of this invention.

We found the compact, lightweight electrode plaque shown in FIG. 2, to offer unique advantages in our battery as the negative iron plate structure. It is made from metal fibers, preferably nickel, or metal coated fibers, such as nickel coated steel or iron. The unloaded plaque 30 is a flexible, expansible, compacted sheet of relatively smooth, generally contacting, intermingled, metal fibers as shown at 31 in the body of the plaque. The plaque has, in the embodiment shown, top edge 32 coined to a high density. The coined area provides a base to which lead tab 33 is spot welded or otherwise attached. Generally, the fibers when they are round have diameters between about 0.0002 to 0.005 inches. The plaque porosity is preferably between 75 and 95 percent porous i.e. having a plaque denisty between 5 and 25 percent of theoretical density. The plaque is extremely lightweight. Active electrode material is loaded into the interstices of the body of this fibrous plaque to provide an electrode plate.

Figure 3:
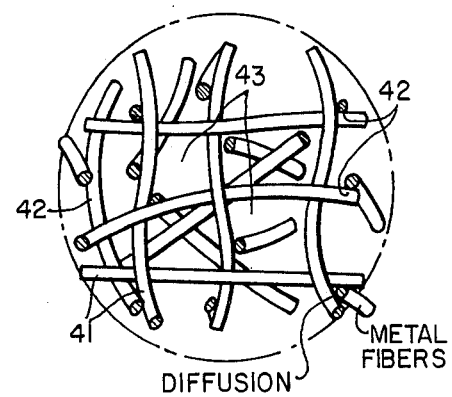
FIG. 3 shows a magnified view of the diffusion bonded fibers of the preferred fiber metal electrode plaque.

The metal fibers, which may be as long as the plaque itself, may be diffusion bonded in a protective atmosphere at temperatures up to the melting point of the fibers used, to provide the preferred, bonded plaque structure shown as a magnified view in FIG. 3. Diffusion bonding also lowers the electrode plate resistance appreciably and thus the internal cell resistance in a finished cell. In diffusion bonding, the fibers must not be melted, or clefts and protuberances will be formed reducing active material loading (volume) within the plaque. There should only be a metallurgical bond and interdiffusion of atoms across the fiber interface.

As can be seen in FIG. 3, the metal fibers 41, bonded together at contact points 42 along their length, have a substantially smooth and even surface and provide large active material pore areas 43 between fibers within which the active battery material can be pasted, impregnated or precipitated. The metal fiber geometry may be other than the substantially circular cross-section shown. The fibers may be laid at any angle up to the ninety degree angle between fibers shown in FIG. 3. As shown, in order to achieve a highly porous plaque, the fibers must have a long length to diameter or cross-section ratio.

The fiber metal plaque that is to be used as the negative iron plate can be loaded with pure iron oxide active material by a pasting or impregnation technique. To promote the charging of the compacted active material, as well as to facilitate the discharging of the electrode plate, a reaction promoting additive such as sulfur, selenium or tellurium, generally in purified form or as a salt can be used with the iron oxides. The additive may preferably be added from about 0.01 to about 20 percent of the weight of the iron oxide active material, generally by mechanical mixing or fuse coating. The additive may also be added, to provide at least about 0.01 weight percent sulfur, by dipping the loaded plate into a solution of a sulfur substituted organic acid such as a thiolic, dithiolic or mercapto carboxylic acid. Of course several methods of sulfur inclusion may be combined. Such an additive keeps the iron plate active material in an active state.

Sulfurized iron oxide and/or iron oxide hydrate particles, prepared according to the teachings of U.S. Pat. No. 3,507,696, assigned to the assignee of this invention, can provide an excellent iron active material for use in the negative battery plate. This iron active material is processed to have a fused coating of high purity additive over the irregular surface of the iron particles. The additive, preferably sulfur, is coated onto the iron particles, which may comprise $FeO$, $Fe_2O_3$, $Fe_3O_4$, $Fe_2O_3 \cdot H_2O$ or mixtures thereof. Further sulfur addition may be accomplished by dipping the plate of loaded sulfurized iron oxide into a solution of mercapto-succinic acid, according to the teachings of U.S. Pat. No. 3,947,292 assigned to the assignee of this invention. This provides an iron active material that does not contain any mercury, which could be extremely hazardous in a modern underseas vehicle environment which may involve nuclear propulsion.

The positive plate can be made of a silver or silver plated metal support, generally a thin perforated silver sheet, or an expanded silver screen, mesh net or strand structure, into which substantially pure (at least about 98% pure) silver metal particles, preferably in powder form, are applied generally by a roll compacting method. The loaded supporting plaque is then heat sintered, to form a substantially pure silver anode of between 50% to 85% porosity. Some minor amount of silver may oxidize during this process, but no silver oxide as such is added deliberately.

At this point the iron (negative) plates and silver (positive) plates must be alternately stacked, and caustic resistant separators placed between adjacent plates to form cells and the cells assembled to make an Fe-Ag battery. The separator must have a graded porosity structure of from about 60% to 90% porosity near the silver plate, to a microporous structure away from the silver plate. The separator layer preferably comprises a plurality of alternating polypropylene sheets. One sheet is about 0.25 mil to about 2 mil thick, and is in microporous form, having average pores from about 0.05 to about 3 microns diameter. The other sheet is about 3 mil to about 8 mil thick, 60% to 90% porous, polypropylene sheet, which is preferably in a non-woven fabric form having average pores from about 3 to about 50 microns diameter.

The silver plate must be disposed between and contact the 60% to 90% porous separators. This combination of plate and separators is then disposed between the microporous separators. Preferably, to insure that no shorting will occur 2 plies of separators should be used, i.e. a microporous, porous, microporous, porous, plate, porous, microporous, porous, microporous separator combination.

This microporous-felted, porous combination multiply laminate is critical to the battery and is particularly effective in preventing sufficient formation of a silver conducting film on the separators to allow shorting, while still allowing silver ion diffusion. The total thickness of the multiply separator should be from between about 10 to about 60 mils. This polypropylene laminate is stable in the electrochemical environment of the battery cell, unaffected by the electrolyte and perhydroxyl ions in solution and not oxidized by the silver.

The rough fabric structure of the porous ply is effective to prevent a continuous or massive silver buildup. After 100 cycles about 0.75 to 1.5 wt.% of the silver is lost through migration. While the polypropylene does not prevent such migration, the particular construction described above is uniquely effective to control it without harmful results to the battery performance. It is the combination of the iron-silver couple and a useful and effective separator system that provides the unique advantage of this battery.

The iron plates in the cell stack up are still in the pasted, unformed condition. Formation of the iron plates can be accomplished by a series of electrical charging and discharging cycles. Charging is accomplished in an aqueous KOH bath. This initial charging increases electrical conductivity and electrochemically attaches the sulfurized iron active material to the plaque fibers. This procedure is done in the finished cell configuration.

EXAMPLE 1

Iron fibers approximately 0.001 × 0.002 × 0.25 to 10 inch long were used in making the flexible expansible fiber metal cathodic plaques. These fibers were laid into unbonded fiber metal sheets. They were then heated, in a protective environment, causing metal to metal diffusion bonds to form at fiber contact points. There was no melting of fibers so as to assure maximum pore volume.

The iron plaques were then coined to 7.9 percent of theoretical density, 92.1 percent porous. An iron sheet was then spot welded onto the top coined corner of the plaques to form a lead tab connection. The construction was similar to that shown in FIGS. 2 and 3 of the drawings. The entire structure was then plated with nickel metal up to about 10% of its final weight.

The "iron" plaques were loaded with sulfurized magnetic iron oxide by a wet pasting technique. The iron oxides contained between about 0.1 wt. % to 0.3 wt. % sulfur. These iron plates were then sized and dried. They contained about 1.75 grams/cm$^3$ plaque volume of iron active material. The plates were then soaked for about ½ hour in a 200 ml solution of about 0.1 molar mercapto-succinic acid, to further insure good sulfur activating effect for the iron electrodes. This added an additional 0.01 wt. % to 2 wt.% sulfur content to the sulfurized iron active material.

The silver active material consisted of pure (99%+) silver powder particles, which were roller pressed into a pure (99%+) silver mesh screen support plaque. The particles were then heat sintered in an oven to provide substantially pure silver anodes of about 60% porosity. Each iron and silver plate was about 3.5 × 6 inches.

Figure 4:
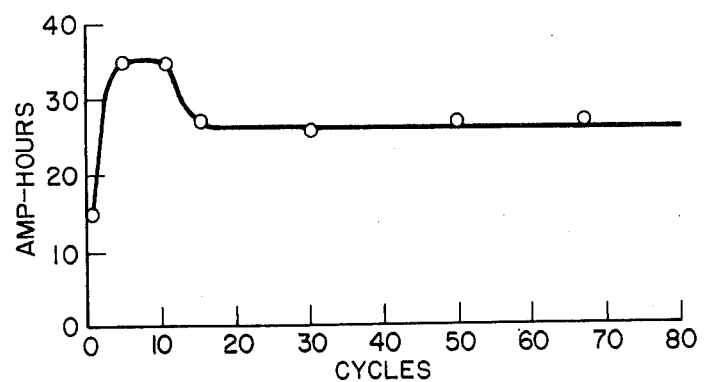
FIG. 4 shows the life cycle results of the silver-iron-silver 3 plate test cell of Example 1.

The capacity of the iron-silver couple and an initial test of their compatibility was checked by a three plate silver-iron-silver cell test. In this test, the iron plate was the limiting capacity component in the test cell. FIG. 4 shows the life cycle results from a silver-iron-silver 3 plate test cell, where the individual plates, described above, were insulated from each other by a polyproylene laminate separator material. The multiply separator consisted of three alternating layers of 1 mil microprous polypropylene sheet, with pores about 0.1 to about 2 microns average diameter, and three alternating layers of 6 mil, 80% porous polypropylene sheet with pores about 4 to about 30 micron average diameter. The cell was placed in a case and immersed in 30 wt. % aqueous KOH.

The maximum capacity in the iron plate of about 35 ampere-hour was obtained after about five forming deep discharge cycles, and this capacity was maintained for another six cycles. The coulombic input on charge was then decreased to improve charge efficiency. The lower coulombic input resulted in a capacity of about 26 ampere-hours. The cycling was maintained for about 70 cycles, and the capacity remained essentially constant, providing an outstanding constant capacity and reliable lifetime for a lightweight and compact electrical couple.

EXAMPLE 2

A prototype battery cell of similar size to a commercial silver-zinc battery cell was constructed. Cycle tests were run under similar conditions at room temperature and pressure for both an iron-silver and a silver-zinc cell. Both cells had twenty silver plates in parallel, constructed as described in EXAMPLE 1. These silver plates were sandwiched between 21 iron plates, constructed as described in EXAMPLE 1, in one case, and 21 zinc plates of standard flat plate construction pasted with zinc oxide active battery material, in the other case. The batteries consisted of 41 plates stacked tightly together, each plate insulated from the other by plastic sheet separator material. The ironsilver stack up used the multiply alternating polypropylene separators described in EXAMPLE 1. The silver-zinc stack up used standard multilayers of unplasticized cellophane having a total thickness of about 15 mils. Each cell weighed approximately 10 pounds in its plastic rectangular parallelopiped case which was approximately 4 inches by 4 inches cross-section by 10 inches high. The construction was similar to that shown in FIG. 1 of the drawings.

Figure 5:
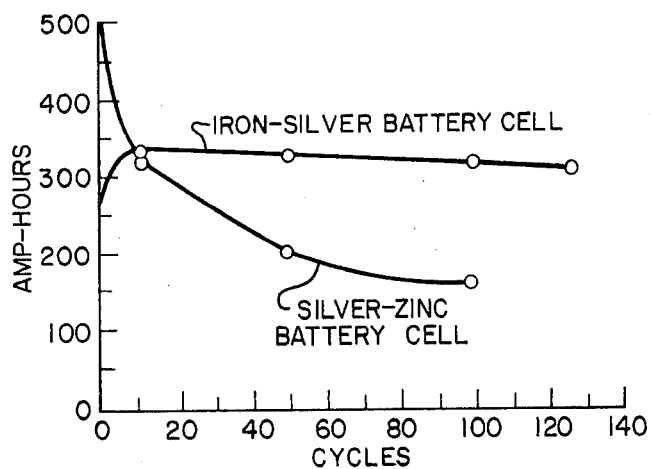
FIG. 5 shows the life cycle results of the ironsilver battery cell of Example 2 versus a silver-zinc battery cell.

Initially the capacity of the silver-zinc cell was higher than the iron-silver cell, due to the in-situ formation of the iron plates which limit the cell capacity, as shown in FIG. 5 of the drawings. However, after ten cycles, the capacity of the iron-silver cell exceeded the silver-zinc 340 ampere-hours to 320 ampere-hours. After 50 cycles the silver-zinc cell capacity had decreased to about 200 ampere-hours and the iron-silver cell had maintained a stable capacity. With further cycling the silver-zinc cell steadily declined in capacity.

After approximately 100 deep discharge cycle testing, the cells were taken out of their cases and the individual plates examined. In both cells the silver plates appeared, as expected, in good physical condition. The zinc plates from the silver-zinc cell were severely deformed, having changed shape by slumping. Excessive and harmful silver build up was seen on the silver-zinc cell cellophane separator system. This silver had severly deteriorated the structural integrity of the cellophane. The iron plates from the iron-silver cell appeared essentially as they did initially. Some silver build up was seen on the multiply polypropylene separator material of the iron-silver battery, but it had no effect on the structural integrity of the separator.

Figure 6:
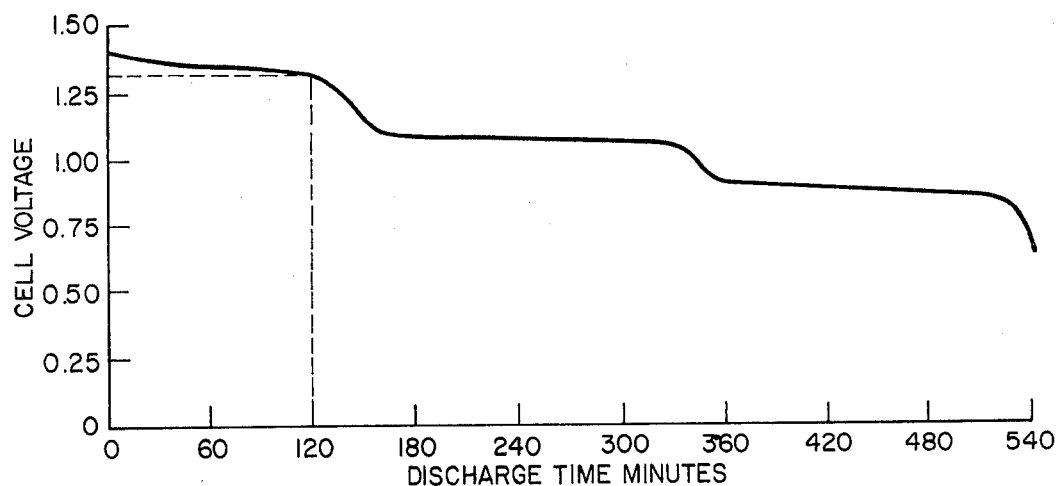
FIG. 6 shows a voltage versus time discharge curve for a completed 41 plate iron-silver battery cell.

Reference to FIG. 6 shows the voltage versus time curve of the prototype iron-silver cell, at room temperature, on its sixteenth discharge cycle. The charge cycle was 80 amperes constant current for eight hours. The discharge was at 40 amperes. The total time was nine hours, yielding a capacity of 360 ampere-hours. The end of charge voltage shown on the left is 1.85 volts. The discharge proceeds on three major plateaus. The time at these various voltage plateaus can be adjusted by cell design. For example the lowest voltage plateau can be made to disappear by increasing the iron plate capacity sufficiently such that the silver plate capacity would be exhausted before the higher oxidation state reaction in the iron plate would take place.

The average voltage of the curve shown in FIG. 6 is 1.1 volts, yielding approximately 400 watt-hours of energy on this discharge. With a cell weight of just over 10 pounds this results in an energy density of nearly 40 watt-hours per pound and 2.5 watt-hours per cubic inch of battery cell. These values are considered quite high. They are especially good for special vehicle propulsion system power sources when combined with good life and reliability.

Figure 7:
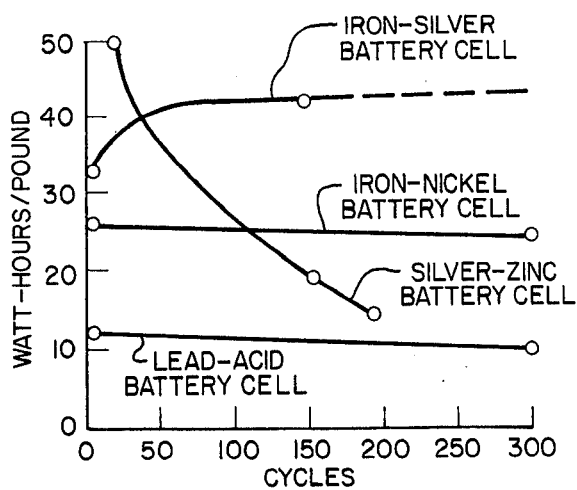
FIG. 7 shows the energy density results of the iron-silver battery cell versus a silver-zinc battery cell.

FIG. 7 shows a comparative graph of energy density of the iron-silver versus the silver-zinc battery cell. As can be seen, the discharge capacity of the ironsilver battery cell exceeded that of the silver-zinc battery cell after about cycle 50 and remained constant for at least about 170 full cycles while the silver-zinc cell deteriorated rapidly after about 50 cycles. Typical results for a high energy density iron-nickel battery cell and a lead acid battery cell are also shown in FIG. 7.

In the discharge of a silver-zinc cell, the zinc forms a soluble complex ionic species. The iron in an ironsilver cell forms an insoluble thermodynamically stable oxide precipitate. Also, the wet life of the iron-silver battery cell will exceed the wet life of the silver-zinc battery cell about 5 years to 2 years.

A pressure-compensated iron-silver battery cell was also successfully tested at temperatures down to 0° C and pressures up to 10,000 psi. and demonstrated stable performance under these conditions. This data indicates that the battery cell of this invention provides a long life, reliable, lightweight and compact battery of high energy density uniquely suited for use as an underseas vehicle power source. It also provides electrodes and separators that are physically strong and highly resistant to damage by heat or electrolyte.

These batteries are suitable for cyclic and float service and can be designed to resist high G and shock loads. They are also insensitive to extreme pitch and roll attitudes offering particular advantages for use on submarines. They do not contain any mercury compounds which might be undesirable on modern nuclear propelled vessels. This battery system can be used in conjunction with an electrolyte circulation system to even more improve performance by ensuring more uniform cell conditions. cm I claim:

1. An iron-silver battery comprising a case and a cover within which are disposed:
   1. at least one positive electrode plate comprising:
      a. a porous supporting plaque comprising silver, having active electrode material consisting essentially of silver distributed thereon,
      b. an electrical lead tab attached to the plaque,
   2. at least one negative electrode plate comprising:
      a. a flexible, expansible, porous supporting plaque comprising contacting metal fibers, having active electrode material comprising iron oxide particles distributed upon and disposing within the pore volume of the plaque,
      b. an electrical lead tab attached to the plaque,
   3. at least one separator between the plates, said separator being made of a material resistant to chemical attack by the electrolyte or ions contained therein, and having a multilayer structure of a microporous layer and a layer of larger pore size or about 60% to about 90% porosity, wherein the silver plate is disposed next to 60% to 90% porous layer,
   4. an alkaline electrolyte, and
   5. means for making electrical connections to the respective plates; wherein the separator is effective to allow silver ion diffusion while limiting formation of a silver conducting film on the separator.

2. The battery of claim 1, wherein the active material of the negative electrode plates comprises iron particles selected from the group consisting of iron oxide, iron oxide hydrate and mixtures thereof, and the separator is a plastic material.

3. The battery of claim 2, wherein the plaque fibers in the negative plate are selected from the group consisting of nickel, nickel coated steel and nickel coated iron fibers, the fibers have metal to metal bonds at their contact points, and the iron particles contain a sulfur additive present between about 0.01% to about 20% of the weight of the iron particles.

4. The battery of claim 2, wherein the separator is a multiply polypropylene material, comprising at least one microporous polypropylene sheet and at least one 60% to 90% porous polypropylene sheet.

5. The battery of claim 4, wherein the microporous separator sheet is about 0.25 mil to about 2 mil thick, the 60% to 90% porous separator sheet is rough polypropylene fabric about 3 mil to about 8 mil thick, and a plurality of separators are disposed between the plates; wherein the total thickness of the plurality of separators is from between about 10 mil to about 60 mil.

6. The battery of claim 4, wherein the lead tabs on the positive and negative plates are turned 180° from each other, each positive tab being connected to a positive terminal and each negative tab being connected to a negative terminal, said terminals extending through the cover.

7. The battery of claim 4, wherein the electrolyte is aqueous KOH, and the cover contains a vent.

8. The battery of claim 5, wherein the silver active electrode material consists of at least 98% pure silver, the microporous separator sheet has average pores of from about 0.05 to about 3 microns diameter and the 60% to 90% porous separator sheet has average pores of from about 3 to about 50 microns diameter.

9. The battery of claim 8, wherein the positive supporting plaque consists essentially of a silver mesh.

10. The battery of claim 9, wherein the energy density is at least about 35 watt-hours/pound after 100 cycles.

11. An iron-silver battery comprising a case and a cover within which are disposed:
   1. at least one positive electrode plate comprising:
      a. a porous supporting plaque comprising silver, having active electrode material consisting of silver distributed thereon,
      b. an electrical lead tab attached to the plaque,
   2. at least one negative electrode plate comprising:
      a. a flexible, expansible, porous supporting plaque comprising contacting metal fibers, having active electrode material comprising iron oxide particles distributed upon and disposed within the pore volume of the plaque,
      b. an electrical lead tab attached to the plaque,
   3. at least one multiply separator between the plates, said separator being made of a material resistant to chemical attck by the electrolyte or ions contained therein, and comprising at least one microporous sheet, about 0.25 mil to about 2 mil thick, having average pores of from about 0.05 to about 3 microns diameter and at least one 60% to 90% porous, rough fabric sheet, about 3 mil to about 8 mil thick, having average pores of from about 3 to about 50 microns diameter, wherein the positive plate is disposed next to a 60% to 90% porous sheet,
   4. an alkaline electrolyte, and 5. means for making electrical connections to the respective plates; wherein the separator is effective to allow silver ion diffusion while limiting formation of a silver conducting film on the separator.

12. The battery of claim 11, wherein the microporous separator sheet is polypropylene the 60% to 90% porous separator sheet is nonwoven polypropylene and a plurality of separators are disposed between the plates, wherein the total thickness of the plurality of separators is from between about 10 mil to about 60 mil.

13. The battery of claim 12, wherein the silver active electrode material consists of at least 98% pure silver and the positive supporting plaque consists essentially of a silver mesh.

14. The battery of claim 13, wherein the active material of the negative electrode plates comprises iron particles selected from the group consisting of iron oxide, iron oxide hydrate and mixtures thereof.

15. The battery of claim 14, wherein the plaque fibers in the negative plate are selected from the group consisting of nickel, nickel coated steel and nickel coated iron fibers, the fibers have metal to metal bonds at their contact points, and the energy density of the battery is at least about 35 watt-hours/pound after 100 cycles.

* * * * *